(12) United States Patent
Rocheblave et al.

(10) Patent No.: US 7,997,642 B2
(45) Date of Patent: Aug. 16, 2011

(54) MOTOR VEHICLE HOOD PROVIDED WITH HOLLOW BODIES

(75) Inventors: Laurent Rocheblave, Villeurbanne (FR); Alexis Rajon, Lyons (FR)

(73) Assignee: Compagnie Plastic Omnium, Lyons (FR)

( * ) Notice: Subject to any disclaimer, the term of this patent is extended or adjusted under 35 U.S.C. 154(b) by 139 days.

(21) Appl. No.: 11/907,800

(22) Filed: Oct. 17, 2007

(65) Prior Publication Data
US 2008/0088154 A1    Apr. 17, 2008

(30) Foreign Application Priority Data

Oct. 17, 2006  (FR) ..................................... 06 54331

(51) Int. Cl.
*B62D 25/10* (2006.01)
(52) U.S. Cl. .......... 296/193.11; 296/187.04; 296/187.09
(58) Field of Classification Search ............. 296/187.04, 296/193.11, 187.09; 180/69.2, 69.21; B62D 25/10
See application file for complete search history.

(56) References Cited

U.S. PATENT DOCUMENTS

| | | | | |
|---|---|---|---|---|
| 4,288,490 A | * | 9/1981 | Alfter et al. ................. | 428/314.8 |
| 5,115,878 A | * | 5/1992 | Hayata ....................... | 180/69.21 |
| 5,605,371 A | | 2/1997 | Borchelt et al. | |
| 5,706,908 A | * | 1/1998 | Sakai et al. .................. | 180/69.2 |
| 7,140,673 B2 | * | 11/2006 | Ito et al. .................... | 296/193.11 |
| 7,467,680 B2 | * | 12/2008 | Mason ........................ | 180/69.2 |
| 2005/0000745 A1 | | 1/2005 | Kamada et al. | |

FOREIGN PATENT DOCUMENTS

| | | |
|---|---|---|
| DE | 101 02 762 A1 | 7/2002 |
| DE | 102 59 981 A1 | 7/2004 |
| EP | 1 504 985 A1 | 2/2005 |
| EP | 1 527 984 A2 | 5/2005 |
| JP | A2005-053285 | 3/2005 |
| JP | A 2005-239092 | 9/2005 |
| KR | 100294405 * | 4/2001 |
| WO | WO 2007063256 A1 * | 6/2007 |

* cited by examiner

*Primary Examiner* — Glenn Dayoan
*Assistant Examiner* — Pinel E Romain
(74) *Attorney, Agent, or Firm* — Oliff & Berridge, PLC

(57) ABSTRACT

The invention relates to a motor vehicle hood comprising a visible outside skin and a lining, in which the lining is shaped in such a manner that: the hood has reinforcements comprising a plurality of hollow bodies defined by the skin and by the lining; and that the hood includes at least one zone having no reinforcement and designed to be placed in register with a localized rigid part under the hood. The reinforcements further comprise at least one rib extending between two of the hollow bodies of the plurality, so as to interconnect the hollow bodies.

14 Claims, 2 Drawing Sheets

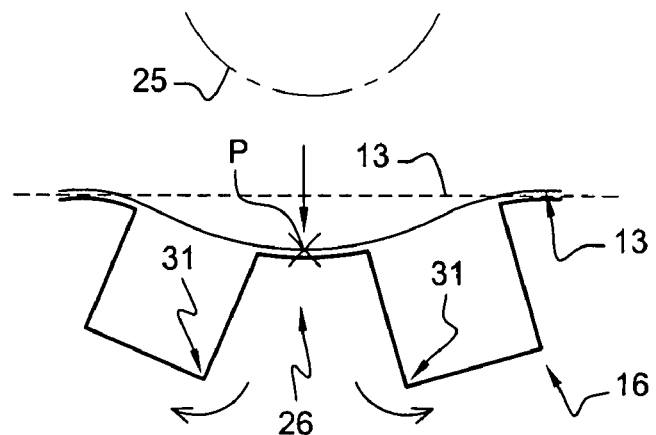
Fig. 4
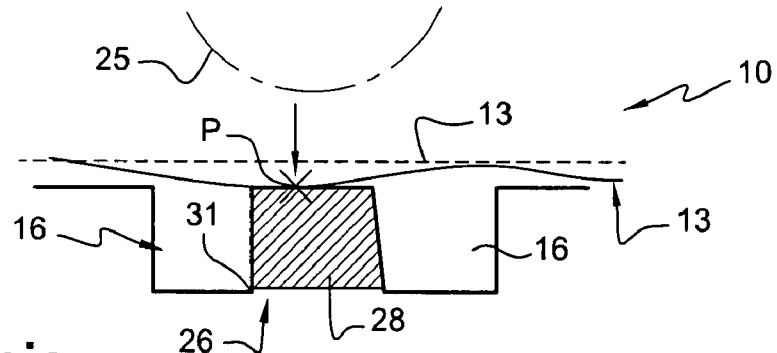
Fig. 4 bis
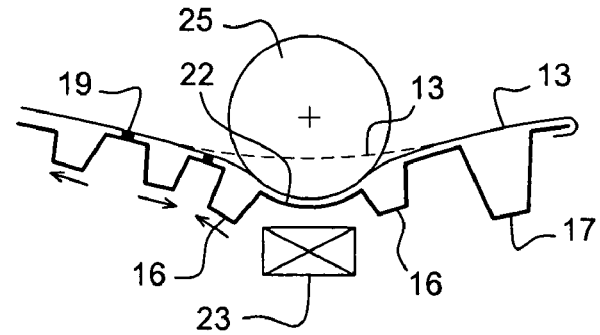
Fig. 5
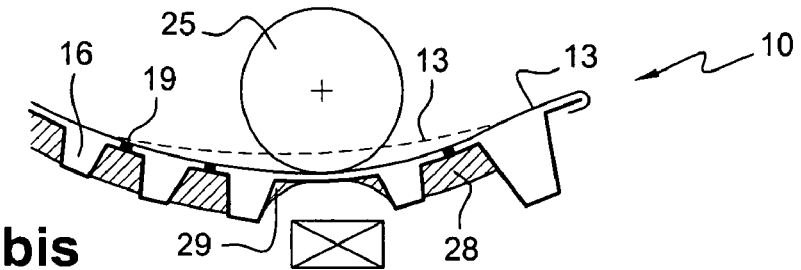
Fig. 5 bis

MOTOR VEHICLE HOOD PROVIDED WITH HOLLOW BODIES

The present invention relates to a motor vehicle hood for closing an engine compartment containing rigid parts.

The hood of a motor vehicle constitutes an impact zone for the head of a pedestrian knocked over by the front of the vehicle. Under such circumstances, on striking the hood, the pedestrian's head is subjected to sudden deceleration that is likely to give rise to severe lesions for the pedestrian.

It is also known that the hood can constitute an effective energy absorber for the head of a pedestrian if the hood deforms so as to allow the pedestrian's head to be pushed into the surface of the hood. The hood can thus absorb a large amount of energy so as to limit the severity of the pedestrian's lesions.

To enable the hood to constitute such an energy absorber, while still providing stiffness in tension, it is known to provide the hood with a visible outside skin and with a lining (or inside skin) that is shaped in such a manner that the hood includes reinforcement comprising a plurality of hollow bodies defined by the skin and the lining.

Nevertheless, a difficulty remains in that the engine compartment often contains at least one rigid part situated very close to the hood. When the hood is indented in register with such a part, the head can thus become strongly decelerated on bearing against the part through the hood. Severe lesions can then be inflicted.

Even if the head impacts against the hood other than vertically over such a rigid part, the extent to which it can be pushed into the hood is limited by the fact that during deformation of the hood its reinforcement in register with the rigid part encounters that rigid part. The hood then suddenly presents high resistance to the head being pushed in any further, thereby also running the risk of lesions for the pedestrian.

One possible solution for protecting pedestrians consists in moving the hood vertically away from the rigid part, so that the hood is located higher up. Nevertheless, that solution goes against present requirements of automobile manufacturers for limiting the height of the hood as much as possible in order to make the vehicle more aerodynamic.

In order to avoid needing to change the height of the hood, another solution disclosed in document JP 2005/053285, consists in shaping the lining in such a manner that the hood includes at least one zone having no reinforcement that is designed to be located in register with the localized rigid part under the hood.

Such a hood thus presents a greater margin for deformation vertically over the rigid part in the engine compartment, since said margin is not reduced by the presence of reinforcement. The increase in margin is substantially equal to the height of the reinforcement. The head of a pedestrian that impacts such a hood thus has a smaller risk of coming into contact with the rigid part.

Nevertheless, although the local absence of reinforcement enables the deformation margin of the hood to be increased, it also increases the deformation stroke of the hood for an impact of given magnitude. The absence of reinforcement indeed reduces the stiffness of the hood and thus its ability to withstand being pushed in.

One solution that can be envisaged for increasing the margin of deformation of the hood without thereby increasing the extent to which it is pushed in the event of an impact against a head consists in increasing the thickness of the skin and/or the lining, thereby nevertheless leading to a considerable increase in the total weight of the hood.

The present invention seeks to remedy the above drawbacks.

The present invention provides a motor vehicle hood comprising a visible outside skin and a lining, in which the lining is shaped in such a manner that:

the hood has reinforcements comprising a plurality of hollow bodies defined by the skin and by the lining; and the hood includes at least one zone having no reinforcement and designed to be placed in register with a localized rigid part under the hood, in which the reinforcements further comprise at least one rib extending between two of the hollow bodies of the plurality, so as to interconnect the hollow bodies.

The term "hollow body" is used to mean a shape having solid walls defining a cavity that is substantially closed. In the context of the invention, the cavity of the hollow body is constituted by a depression formed in the lining and covered by the skin, the skin and the lining being secured to each other by spots of cement. The term "rib" is used to mean a solid wall projecting from a plane. In the context of the invention, the lining is made of a plate that is not plane, and that is shaped in such a manner as to form the depressions of the hollow bodies, with the rib projecting from said plate.

The inventors have found that the rib serves to transmit forces passing through one of two hollow bodies to the other hollow body. This enables impacts to be absorbed better since the area of the hood that contributes to such absorption is increased. The deformation associated with the impact is better distributed between a plurality of hollow bodies.

The rib thus enables the overall stiffness of the hood to be increased and enables its deformation stroke to be reduced for an impact of given magnitude, including in the zone that has no reinforcement. In addition, given that no modification is made to the zone of the hood that has no reinforcement, the deformation margin of the hood remains unchanged.

The rib also makes it possible to stabilize the hollow bodies by connecting them together and preventing the hollow bodies from opening up in the event of an impact. The rib also serves, in the event of an impact, to prevent the hollow bodies from splaying apart, i.e. from the hollow bodies pivoting about the interstitial zone between two hollow bodies.

Also, the rib is constituted by a small quantity of material and therefore does not significantly increase the total weight of the hood.

The hood of the invention may also include one or more of the following characteristics:

The two hollow bodies are of substantially elongate shape and extend substantially parallel, the rib extending substantially transversely relative to the hollow bodies.

The width of each hollow body and/or the spacing between two adjacent hollow bodies lies in the range 40 millimeters (mm) to 80 mm. The term "width of a hollow body" is used to mean the maximum distance between two hollow body walls defining the cavity thereof, and the term "spacing between two adjacent hollow bodies" means the maximum distance between the adjacent walls of two hollow bodies. In this way, because of these dimensions, the head of the pedestrian strikes the hood over at least one hollow body and at least one interstitial zone situated between the bodies, more frequently than it strikes two hollow bodies or one interstitial zone. The behavior of the hood is thus more uniform in response, to a head impact than that of a hood in which the hollow bodies are spaced part more widely, in particular a hood made of sheet metal, and regardless of the location where the pedestrian's head strikes the hood.

The reinforcements further comprise at least one rib extending between a margin of the zone having no reinforcement and a hollow body adjacent to said zone. This makes it possible to further limit the extent to which hollow bodies adjacent to the zone having no reinforcement splay apart.

The reinforcements further comprise at least one rib localized in a hollow body, between the lining and the skin. Preferably, this rib is disposed in such a manner as to interconnect the side walls of the hollow body, to further limit the extent to which the side walls of the hollow body open up in the event of a head impact, thereby contributing to reducing the extent to which the hood is pushed in.

Each hollow body extends substantially in the longitudinal direction of the vehicle when the hood is mounted on the vehicle.

In the zone having no reinforcement, the lining is constituted by a web of plastics material against the skin of the hood, or includes an orifice, thus enabling the weight of the hood to be reduced.

The lining is constituted by a wall, the wall being of greater thickness in the zone having no reinforcement than in the remainder of the lining. This makes it possible to stiffen the lining in said zone and to further reduce the extent to which the hood is deformed when a pedestrian's head strikes the hood in register with the hard point.

The skin is made of aluminum, of steel, or of plastics material (thermoplastic or thermosetting).

The lining is made of plastics material, in particular of polyamide. It may also be made of composite material or of a metal/plastic hybrid material. A lining of plastics material is most advantageous. The method used for shaping plastics material (molding) provides greater freedom in designing the hood. Such a lining can present spacing between the hollow bodies that is small compared with the spacing needed by a sheet metal hood, where the above-mentioned dimensions cannot be achieved using presently-known shaping methods (stamping). It is also possible to cause the thickness of the lining to vary in different zones of the hood, which is not simple to do at present with a hood made of sheet metal. In addition, plastics material, because it is not as stiff as sheet metal, makes it possible to attenuate differences in stiffness between the hollow bodies and the zones having no hollow bodies, thus also providing better uniformity for the hood. In addition, the hollow bodies of a plastics material lining made by molding can present side walls forming an angle that is smaller relative to the vertical, when the lining is mounted on a vehicle, than is possible for the hollow body side walls of a sheet metal hood fabricated by stamping. This makes it possible to increase the first deceleration peak to which the head is subjected and to diminish the extent to which it is pushed into the hood.

The rib is integrally molded with the lining.

The lining is made of fiber-reinforced material, in particular of sheet molding compound (SMC) or of advanced molding compound (AMC).

The invention can be better understood on reading the following description given purely by way of example and made with reference to the accompanying drawings, in which:

FIG. 4 is a detail view of a prior art hood;

FIG. 4b is is a detail view of the hood of FIG. 3;

FIG. 5 is a detail view of a prior art hood, including the zone without reinforcement; and FIG. 5b is is a detail view of a hood of FIG. 3, including the zone without reinforcement.

Figure 1:
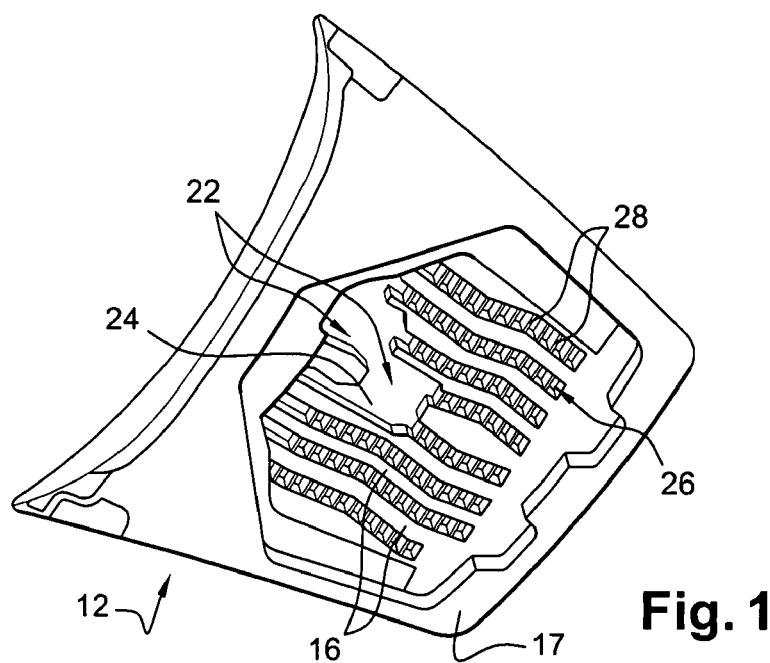
FIG. 1 is a perspective view from below of a hood constituting a particular embodiment of the invention.

FIG. 1 shows a lining 12 of a hood 10 in an embodiment of the invention. The lining 12 is constituted by a plate of plastics material shaped in such a manner as to comprise a plurality of depressions 16 forming orifices that open out into a top face 14 of the lining. The top face 14 of the lining 12 is designed to be covered by a skin 13 of the hood. The lining 12 also has a peripheral depression 17, forming a frame defining the peripheral edge of the lining.

The depressions 16 are elongate in shape, being substantially parallel, and they extend in the longitudinal direction of the motor vehicle when the hood is mounted on the vehicle.

Figure 3:
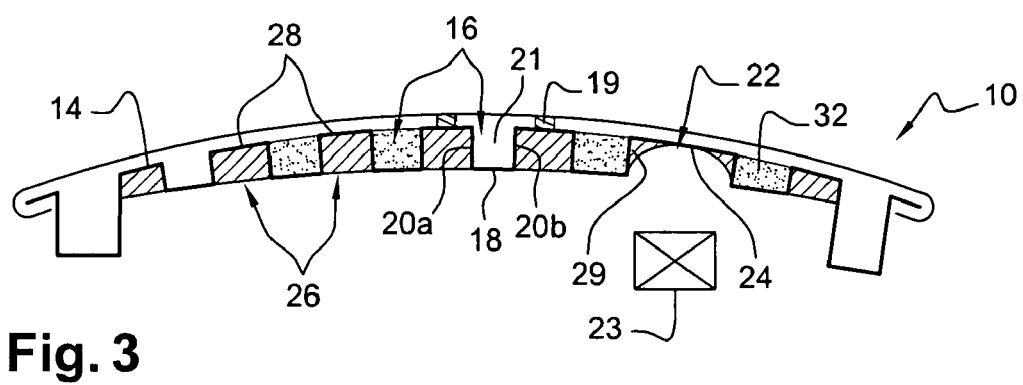
FIG. 3 is a cross-section of a hood of the invention.

As shown in FIG. 3, each depression 16 is of essentially polygonal section and comprises a bottom wall 18 and two side walls 20a and 20b that are essentially vertical when the hood is mounted on the vehicle. Each depression 16 is covered by the skin 13 of the hood 10, so as to define a substantially closed cavity extending between the lining 12 and the skin 13 of the hood. The skin 13 is fastened to the lining around the depression 16 by spots of cement 19. The cavity 21 thus forms a hollow body.

The frame 17 covered by the skin 13 also defines a peripheral cavity forming a hollow body.

Figure 2:
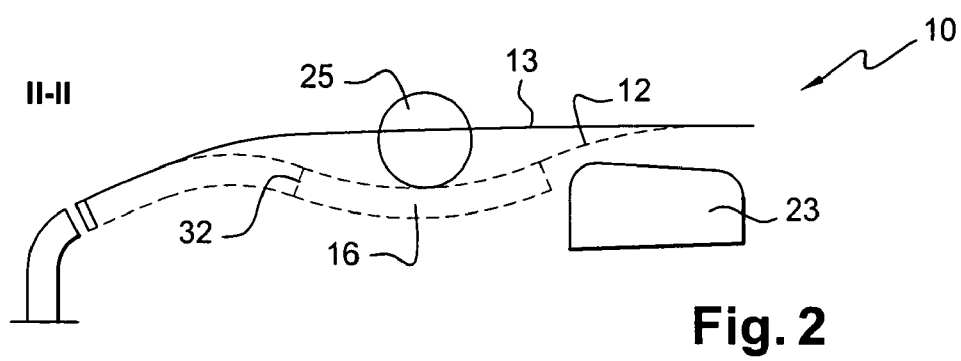
FIG. 2 is a diagrammatic section on II-II of the FIG. 1 hood.

In the embodiment described, the lining 12 also has two zones 22, each designed to cover a rigid part of the engine compartment, e.g. a battery 23 of the motor vehicle, as shown in FIG. 2. These zones 22 do not have any reinforcement, and in particular they do not have any hollow bodies 21, and in this zone the lining 12 is constituted merely by a portion of the plastic material constituting the lining, forming a web 24 of material having thickness lying in the range 2 mm to 5 mm, and designed to be pressed against the skin 13, in this example ignoring the thickness of the cement.

In FIG. 2, it can be seen that in the event of a pedestrian's head 25 impacting against the hood 13, the lining 12 of the hood 10 (shown in dashed lines after deformation) can deform and accompany the pedestrian's head 25 without encountering the battery 23 because the lining 12 does not have any reinforcement in the zone 22 in register with the battery 23.

The lining 12 also has interstitial zones 26 delimited by the hollow bodies 21 and visible in FIG. 3.

The width L1 of these interstitial zones 26 corresponds to the spacing between two adjacent hollow bodies 21 and lies in the range 40 mm to 80 mm, as does the width L2 of each of the hollow bodies 21, i.e. the distance between its walls 20a and 20b.

The interstitial zones 26 have ribs 28 projecting from the bottom face of the plate constituting the lining.

The ribs 28 extend between the hollow bodies 21 transversely relative to the hollow bodies 21, i.e. they extend in the transverse direction of the motor vehicle when the hood is mounted on the vehicle.

The ribs interconnect the side walls 20a and 20b of two adjacent hollow bodies 21. They are dimensioned in such a manner as to have substantially the same height as the hollow bodies 21, thus making it possible in the event of the hood being dented as a result of an impact against a head, to make the deformation of the hood uniform and avoid any splaying apart of the hollow bodies.

FIGS. 4 and 4b is show the effect of an impact from a pedestrian's head 25 in an interstitial zone 26 of the hood. FIG. 4 shows a prior art hood and FIG. 4b is shows a hood of the invention.

As can be seen in FIG. 4, in the prior art, as a result of a pedestrian's head 25 impacting a point P in the interstitial zone 26 situated between two adjacent hollow bodies 21, the skin 13 is pressed down from its initial position shown in dashed lines. The lining absorbs the energy of the impact poorly, and the skin is pressed down a long way because the hollow bodies adjacent to the point of impact P splay apart. While splaying apart, the bottom ends 31 of the facing side walls 20a and 20b of two adjacent hollow bodies move away from each other.

This deep indentation can lead to an increase in the deformation stroke for an impact of given intensity in zones that do not have any reinforcement. The deformation stroke is then in danger of consuming all of the deformation margin, and that can lead to severe lesions for the pedestrian on coming in contact with a rigid part 23.

In contrast, and as shown in FIG. 4b is, in the event of a pedestrian's head 25 impacting in an interstitial zone 26 of a hood of the invention, the splaying apart of the hollow bodies is strongly limited. The bottom ends 31 of the facing side walls 20a and 20b of two adjacent hollow bodies 21 are interconnected by the rib 28, and the distance between these two ends thus remains substantially constant. As a result, the lining deforms little and the rib 28 transmits the force due to the impact of the head to the hollow bodies adjacent to the interstitial zone, thereby enabling the energy of the impact to be absorbed by a large area of the hood and avoiding the hood becoming deeply indented.

Furthermore, as can be seen in FIG. 4b is, because of the dimensions of the hollow bodies 21 and of the interstitial zone 26, the pedestrian's head is necessarily placed in register with a hollow body 21 in the event of an impact with the hood, thus serving to increase the rate at which the head is decelerated and thus to decrease the depth to which the hood is pushed in.

In FIG. 3, the ribs 29 are also provided between a margin of the zone 22 having no reinforcement and each of the hollow bodies 21 immediately adjacent to the zone 22. These ribs are disposed so as to conserve the deformation margin over the rigid part 23. These ribs 29 are optional.

It can be seen that the reinforcement also comprises ribs 32 located inside some of the hollow bodies 21, projecting from the top face of the plate constituting the lining. These ribs 32 serve to interconnect the side walls 20a and 20b of a given hollow body. The extent to which the side walls of the hollow body can splay apart during an impact against a head is thus limited. These ribs 32 are optional.

FIGS. 5 and 5b is show the effect of a pedestrian's head 25 impacting against a zone 22 that has no reinforcement. FIG. 5 shows a prior art hood and FIG. 5b is shows a hood of the invention.

As can be seen in FIG. 5, in the event of a head impacting in the zone 22, the adjacent hollow bodies splay apart, i.e. the bottom ends 31 of the hollow bodies immediately adjacent to the zone 22 move away from each other and respectively towards the bottom ends of the nearby hollow bodies that are not adjacent to the zone 22. The skin 13 is thus deeply indented in the zone 22 away from its initial position as shown in dashed lines.

In FIG. 5b is, the ribs 28 and 29 serve to limit the splaying apart of the hollow bodies, and also serves to keep the distance between the nearby hollow bodies constant, by keeping a constant angle of inclination between the lining in the vicinity of the zone 22 having no reinforcement and the immediately adjacent hollow zone, with the help of the ribs 29. The force due to the impact is thus transmitted to the adjacent hollow bodies and the curve representing the deformation of the hood is more highly tensioned, i.e. the indentation is less localized, less deep, and better distributed over the surface of the hood.

In the embodiment shown, the hood skin 13 is made of aluminum and the lining 12 is made of a molded plastics material, in particular of a fiber-reinforced plastics material such as sheet molding compound (SMC) or advanced molding compound (AMC).

A hood made of plastics material gives greater freedom in design than a hood made of sheet metal and enables the uniformity of the hood to be increased, thereby maximizing the robustness of the design, and thus improving protection for a pedestrian suffering a head impact.

The ribs 28, 29, and 32 are also made of plastics material and are molded together with the lining 12, thus making the hood simple to fabricate. The ribs may be taller than the hollow bodies 16 and they may also be connected to the bottom walls 18 of the hollow bodies 21.

In addition, the front and/or rear portion of the frame 17 of the lining 12 (extending in the transverse direction of the vehicle when the hood is mounted on the vehicle) may also include transverse ribs 32 (i.e. ribs extending in the longitudinal direction of the vehicle when the hood is mounted on the vehicle), extending inside the front and/or rear portion of the frame 17 so as to avoid this peripheral depression splaying open, in particular in the event of a head impact against the margin of the hood.

The hollow bodies may extend in a configuration other than that shown, for example in a star configuration, or they may be sinuous in a horizontal plane about a direction corresponding to the longitudinal direction of the vehicle, when the hood is mounted on a vehicle.

The lining may also be of varying thickness, and in particular it may be thicker in zones that do not have any reinforcement.

Finally, the invention is not limited to the materials described. In particular, the skin could be made of plastics material (thermoplastic or thermosetting), of steel, or of sheet metal, and the lining may be made of a metal material, in which case the ribs are fitted to or overmolded on the lining.

Naturally, the above-described embodiment and variants do not present any limiting character and could receive any other desirable modification without thereby going beyond the ambit of the invention.

The invention claimed is:

1. A motor vehicle hood comprising a visible outside skin and a lining, in which the lining is shaped in such a manner that:
   the hood has reinforcements comprising a plurality of hollow bodies defined by the skin and by the lining; and
   the hood includes at least one zone having no reinforcement and designed to be placed in register with a localized rigid part under the hood;
   wherein the reinforcements further comprise at least one rib projecting from a bottom face of the lining and extending between two of the hollow bodies of the plurality of hollow bodies, so as to interconnect the hollow bodies, and
   wherein the lining comprises plastic.

2. A hood according to claim 1, in which the two hollow bodies are of substantially elongate shape and extend substantially parallel, the rib extending substantially transversely relative to the hollow bodies.

3. A hood according to claim 1, in which the width of each hollow body and/or the spacing between two adjacent hollow bodies lies in the range 40 mm to 80 mm.

4. A hood according to claim 1, in which the reinforcements further comprise at least one rib localized in a hollow body, between the lining and the skin.

5. A hood according to claim 1, in which the reinforcements further comprise at least one rib extending between a margin of the zone having no reinforcement and a hollow body adjacent to said zone.

6. A hood according to claim 1, in which each hollow body extends substantially in the longitudinal direction of the vehicle when the hood is mounted on the vehicle.

7. A hood according to claim 1, in which, in the zone having no reinforcement, the lining is constituted by a web of plastics material against the skin of the hood.

8. A hood according to claim 1, in which the lining is constituted by a wall, the wall being of greater thickness in the zone having no reinforcement than in the remainder of the lining.

9. A hood according to claim 1, in which the skin is made of aluminum, of steel, or of plastics material.

10. A hood according to claim 1, in which the rib is integrally molded with the lining.

11. A hood according to claim 1, in which, in the zone having no reinforcement, the lining includes an orifice.

12. A hood according to claim 1, in which the plastic of the lining includes polyamide of composite material.

13. A hood according to claim 1, in which the plastic of the lining includes a fiber-reinforced material selected from a group consisting of sheet molding compound (SMC), an advanced molding compound (AMC), or a metal/plastic hybrid material.

14. A hood according to claim 13, in which the fiber-reinforced material is the sheet molding compound (SMC) or the advanced molding compound (AMC).

* * * * *

UNITED STATES PATENT AND TRADEMARK OFFICE
CERTIFICATE OF CORRECTION

| | |
|---|---|
| PATENT NO. | : 7,997,642 B2 |
| APPLICATION NO. | : 11/907800 |
| DATED | : August 16, 2011 |
| INVENTOR(S) | : Rocheblave et al. |

It is certified that error appears in the above-identified patent and that said Letters Patent is hereby corrected as shown below:

On title page, Item (75) please change Inventor "Alexis Rajon, Lyons (FR)" to recite "Alexis Rajon, Lyon (FR)"

On title page, Item (73) please change Assignee city "Lyons (FR)" to "Lyon (FR)"

Signed and Sealed this
Eleventh Day of October, 2011

David J. Kappos
*Director of the United States Patent and Trademark Office*